(12) United States Patent
Kobayashi et al.

(10) Patent No.: US 6,338,890 B1
(45) Date of Patent: Jan. 15, 2002

(54) BIAXIALLY ORIENTED LAMINATED POLYESTER FILM

(75) Inventors: Ieyasu Kobayashi; Toshifumi Osawa, both of Sagamihara (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/462,262

(22) PCT Filed: Apr. 30, 1999

(86) PCT No.: PCT/JP99/02329

§ 371 Date: Jan. 6, 2000

§ 102(e) Date: Jan. 6, 2000

(87) PCT Pub. No.: WO99/56952

PCT Pub. Date: Nov. 11, 1999

(30) Foreign Application Priority Data

| May 6, 1998 | (JP) | 10-123260 |
| Jul. 28, 1998 | (JP) | 10-212507 |
| Jul. 28, 1998 | (JP) | 10-212509 |

(51) Int. Cl.[7] .................. B32B 27/08; B32B 27/18; B32B 27/20; B32B 27/35

(52) U.S. Cl. .............. 428/141; 428/212; 428/213; 428/323; 428/327; 428/331; 428/458; 428/480; 428/482; 428/694 ST; 428/694 SG; 428/910

(58) Field of Search ................ 428/141, 212, 428/213, 323, 327, 331, 457, 458, 480, 482, 694 ST, 694 SG, 910

(56) References Cited

U.S. PATENT DOCUMENTS 4,798,759 A * 1/1989 Dallman et al. ............ 428/220
5,670,236 A * 9/1997 Kotani et al. ................ 428/141

FOREIGN PATENT DOCUMENTS

| JP | 3-90329 | | 4/1991 |
| JP | 04-259548 A | * | 9/1992 |
| JP | 06-182953 | * | 7/1994 |
| JP | 9-220795 | | 8/1997 |

* cited by examiner

Primary Examiner—Vivian Chen
(74) Attorney, Agent, or Firm—Sughrue Mion, PLLC (57) ABSTRACT

A biaxially oriented laminated polyester film comprising a first polyester layer which contains two different types of inert fine particles having different average particle diameters and has a surface roughness of 4 to 15 nm and a second polyester layer which may contain inert fine particles and has a surface roughness of 0.5 to 3.5 nm. The film has a friction coefficient between the first polyester layer and the second polyester layer of 0.5 or less and a good roll form. A cover layer may be further formed on the second polyester layer. The film can be used as a magnetic recording medium by forming a magnetic layer on the second polyester layer or the cover layer overlying the second polyester layer.

28 Claims, 1 Drawing Sheet

FIG. 1 debris of 2 mm or more in diameter length of one rolled film

FIG. 2 vertical wrinkles

Wa, Wb : vertical wrinkles which are not deleted though slightly hand-stretching Wo : width of film product $$\text{rate of vertical wrinkles} = \frac{Wa + Wb}{Wo} \times 100\ (\%)$$

BIAXIALLY ORIENTED LAMINATED POLYESTER FILM

TECHNICAL FIELD

The present invention relates to a biaxially oriented laminated polyester film. More specifically, it relates to a biaxially oriented laminated polyester film which has excellent winding properties and handling properties and can provide excellent electromagnetic conversion characteristics when used as a base film for high-density magnetic recording media, preferably for digital magnetic recording media, particularly for ultra high-density magnetic recording media.

BACKGROUND ART

A biaxially oriented polyester film typified by a polyethylene terephthalate film is used for various purposes, particularly as a base film for magnetic recording media, because of its excellent physical and chemical properties.

Along with recent efforts made to increase the density and capacity of a magnetic recording medium, a flatter and thinner base film is desired. Particularly, a multi-layer metal-type tape having performance equivalent to a deposited tape has been developed and a demand for a flat base film has been arising. However, when the surface of a base film is flattened to maintain excellent electromagnetic conversion characteristics, its slipperiness or air squeezability deteriorates. As a result, when the film is to be rolled, it is apt to have wrinkles or debris, which make it extremely difficult to roll the film. When the slipperiness of the base film is low in the film processing step, the friction of the base film with a metal roll in contact with the base film increases, whereby the film is wrinkled, so that a magnetic layer cannot be formed nicely or that the film cannot be calendered well.

To improve the slipperiness of a polyester film, the following methods are employed: (1) one in which inert particles are precipitated from a catalyst residue in a raw material polymer in the production process and (2) one in which the surface of a film is made uneven, for example, by adding inert particles. Generally speaking, the greater the size or content of particles contained in the film the more the slipperiness of the film is improved.

Meanwhile, as described above, the surface of a base film is desired to be as even as possible in order to improve electromagnetic conversion characteristics. When a magnetic recording medium is formed from a base film having a rough surface, the unevenness of the surface of the base film is reflected on the surface of a magnetic layer after the formation of the magnetic layer, thereby deteriorating electromagnetic conversion characteristics. In this case, the larger the size and content of particles contained in the base film the greater the surface roughness of the base film becomes, thereby deteriorating electromagnetic conversion characteristics.

To improve both slipperiness and electromagnetic conversion characteristics which are antipodal properties, there is a widely known means of producing a laminated film having an even surface on which a magnetic layer is formed for improving electromagnetic conversion characteristics and an opposite rough surface for improving slipperiness.

JP-A 3-90329 discloses a biaxially oriented thermoplastic resin film formed by laminating a film consisting essentially of a thermosetting resin A and inert particles A and B and having a thickness of 0.01 $\mu$m or more on at least one side of a film consisting essentially of a thermoplastic resin B by coextrusion. In this case, the average particle diameter of the inert particles A is 0.1 to 10 times as large as the thickness of the film of the thermoplastic resin A and the inert particles B are agglomerates of primary particles having a smaller average particle diameter than the average particle diameter of the inert particles A and no directionability.

However, even when the above biaxially oriented laminated polyester film is used and the surface opposite to the magnetic layer-formed surface (to be referred to as "rough surface" hereinafter) is roughened, a lubricant exerts an influence upon the magnetic layer-formed surface, undulates the even surface and deteriorates the flatness of the even surface according to the quantity, type and size of the lubricant to be added to the rough surface, because the thickness of the base film is very small.

Particularly, in the latest high-density magnetic recording medium, a flatter magnetic layer is desired, a metal calender having a high linear pressure is used, and the projection of protrusions from the rough surface has a greater adverse influence upon the surface properties of the even surface.

To reduce the projection of protrusions onto the even surface from the rough surface, there have been proposed a method for reducing the particle diameter of a lubricant contained in the rough surface and a method for containing a small amount of a lubricant having a large particle diameter in the rough surface. However, in the former case, sufficient air squeezability cannot be obtained because the height of a protrusion formed is low whereas in the latter case, sufficient film slipperiness cannot be obtained because the density of protrusions formed is low. When the film is rolled, its surface has vertical wrinkles in the former case and debris in the latter case, thereby making it impossible to obtain a sufficiently high product yield.

Meanwhile, to improve electromagnetic conversion characteristics, a film having a more even surface for a magnetic layer is desired and there is proposed a flat layer containing substantially no lubricant. In this case, the running properties of the even surface in the tape-processing step are unsatisfactory, wrinkles appear on the film in that step, and the product yield is greatly reduced.

DISCLOSURE OF THE INVENTION

It is an object of the present invention to provide a biaxially oriented laminated polyester film which has excellent film winding properties and handling properties and can provide excellent electromagnetic conversion characteristics when used as a base film for high-density magnetic recording media, preferably for digital magnetic recording media, particularly for ultra high-density magnetic recording media.

Other objects and advantages of the present invention will become apparent from the following description.

According to the present invention, the above objects and advantages of the present invention are attained by a biaxially oriented laminated polyester film comprising:

(A) a first polyester layer which comprises a first aromatic polyester containing inert fine particles and has a surface roughness of 4 to 15 nm, the inert fine particles consisting of first inert fine particles having an average particle diameter of 0.2 to 0.4 $\mu$m and second inert fine particles having an average particle diameter which is 0.1 to 0.3 $\mu$m smaller than that of the first inert fine particles, and the contents of the first inert fine particles and the second inert fine particles being 0.05 to 0.4 wt % and 0.1 to 0.8 wt % based on the first aromatic polyester, respectively; and (B) a second polyester layer comprising a second aromatic polyester which may contain inert fine particles and having a surface roughness of 0.5 to 3.5 nm, the inert fine particles being third inert fine particles having an average particle diameter of 0.05 to 0.2 µm and the content of the third inert fine particles being 0 to 0.1 wt % based on the second aromatic polyester,
(C) the friction coefficient between the first polyester layer and the second polyester layer being 0.5 or less.

DETAILED DESCRIPTION OF THE INVENTION

The present invention aims to obtain a biaxially oriented laminated polyester film having excellent electromagnetic conversion characteristics for use in the above high-density magnetic recording media and excellent winding properties and running properties as abase film by specifying the particle diameters and contents of lubricants to be contained in the rough surface and the flat surface, the surface roughnesses of the rough surface and the flat surface and the friction coefficient of the film.

The first aromatic polyester of the first polyester layer and the second aromatic polyester of the second polyester layer in the present invention are preferably a polyester comprising an aromatic dicarboxylic acid as a main acid component and an aliphatic glycol as a main glycol component. This polyester is substantially linear and has film-forming properties, especially film-forming properties with regard to melt molding. Illustrative examples of the aromatic dicarboxylic acid include terephthalic acid, 2,6-naphthalenedicarboxylic acid, isophthalic acid, diphenoxyethane dicarboxylic acid, diphenyldicarboxylic acid, diphenyl ether dicarboxylic acid, diphenylsulfone dicarboxylic acid, diphenyl ketone dicarboxylic acid, anthracenedicarboxylic acid and the like. Illustrative examples of the aliphatic glycol include polymethylene glycols having 2 to 10 carbon atoms such as ethylene glycol, trimethylene glycol, tetramethylene glycol, pentamethylene glycol, hexamethylene glycol and decamethylene glycol; and alicyclic diols such as 1,4-cyclohexane dimethanol.

In the present invention, the first and second aromatic polyesters preferably comprise alkylene terephthalate and/or alkylene-2,6-naphthalene dicarboxylate as a main constituent component. Of these polyesters, particularly preferable are polyethylene terephthalate, polyethylene-2,6-naphthalene dicarboxylate, and a copolymer comprising terephthalic acid and/or 2,6-naphthalenedicarboxylic acid in an amount of 80 mol % or more of the total of all the dicarboxylic acid components and ethylene glycol in an amount of 80 mol % or more of the total of all the glycol components. The copolymer may contain the above aromatic dicarboxylic acids other than terephthalic acid and/or 2,6-naphthalenedicarboxylic acid; aliphatic dicarboxylic acids such as adipic acid and sebacic acid; and alicyclic dicarboxylic acids such as cyclohexane-1,4-dicarboxylic acid, in an amount of 20 mol % or less of the total of all the acid components and may contain the above glycols other than ethylene glycol; aromatic diols such as hydroquinone, resorcin and 2,2-bis(4-hydroxyphenyl)propane; aliphatic diols having an aromatic ring such as 1,4-dihydroxydimethylbenzene; and polyalkylene glycols (polyoxyalkylene glycols) such as polyethylene glycol and polytetramethyl glycol, in an amount of 20 mol % or less of the total of all the glycol components.

The above polyester in the present invention comprehends polyesters obtained by copolymerizing or bonding a component derived from an oxycarboxylic acid such as an aromatic oxyacid, as exemplified by hydroxybenzoic acid, and aliphatic oxyacid, as exemplified by ω-hydroxycaproic acid, in an amount of 20 mol % or less of the total of all the dicarboxylic acid components and oxycarboxylic acid components.

The polyester in the present invention further comprehends polyesters obtained by copolymerizing a polycarboxylic acid or polyhydroxy compound having three or more functional groups, such as trimellitic acid or pentaerythritol, in such an amount that they are substantially linear, for example, in an amount of 2 mol % or less of the total of all the acid components.

The above polyester is known per se and can be produced by a process known per se. The above polyester preferably has an intrinsic viscosity measured at 35° C. in o-chlorophenol of 0.4 to 0.9, more preferably 0.5 to 0.7, particularly preferably 0.55 to 0.65.

The biaxially oriented laminated polyester film of the present invention consists of the first polyester layer and the second polyester layer. The polyesters of the two layers may be the same or different but preferably the same.

The biaxially oriented laminated polyester film of the present invention contains first and second inert fine particles having different average particle diameters in the first polyester layer. The average particle diameter ($D_1$) of the first inert fine particles is 0.2 to 0.4 µm and the difference ($D_{1-2}$) between the average particle diameter ($D_1$) of the first inert fine particles and the average particle diameter ($D_2$) of the second inert fine particles is 0.1 to 0.3 µm, the content of the first inert fine particles is 0.1 to 0.4 wt %, and the content of the second inert fine particles is 0.1 to 0.8 wt %.

When large-sized particles are used in a single-component lubricant system, the content of the particles must be reduced from the viewpoint of electromagnetic conversion characteristics, thereby increasing the friction coefficient of the film. As a result, when the film is rolled, its surface has debris, which make it difficult to roll the film nicely. When small-sized particles are used, the content of the particles can be increased but satisfactory air squeezability cannot be obtained. As a result, when the film is rolled, it has vertical wrinkles, which make it difficult to roll the film nicely. The particle diameters and content of the particles cannot be well balanced in the single-component lubricant system due to the relationship between the formation of debris and vertical wrinkling.

The average particle diameter ($D_1$) of the first inert fine particles is 0.2 to 0.4 µm, preferably 0.25 µm or more and less than 0.35 µm, particularly preferably about 0.3 µm. When the average particle diameter is smaller than 0.2 µm, air squeezability become insufficient, vertical wrinkles are formed, and the film cannot be rolled nicely. On the other hand, when the average particle diameter is larger than 0.4 µm and the obtained film is used as a base film for the latest ultra high-density magnetic recording medium, the content of the inert fine particles cannot be increased so much from the viewpoint of electromagnetic conversion characteristics and the friction coefficient of the film becomes high. As a result, the surface of the film has debris, which make it difficult to roll the film nicely. The content of the first inert fine particles is 0.05 to 0.4 wt %, preferably 0.1 to 0.4 wt %, more preferably 0.15 to 0.3 wt %. When the content is smaller than 0.05 wt %, the friction coefficient of the obtained film becomes high. As a result, when the film is rolled, its surface has debris, which make it difficult to roll the film nicely. When the content is larger than 0.4 wt %, on the other hand, satisfactory electromagnetic conversion characteristics cannot be obtained.

The average particle diameter ($D_2$) of the second inert fine particles is 0.1 to 0.3 µm, preferably 0.1 to 0.2 µm smaller than the average particle diameter ($D_1$) of the first inert fine particles. When the difference ($D_1$–$D_2$) is smaller than 0.1 µm, the system becomes close to a single-component system and has the same problems as those the single-component system has. When the difference is larger than 0.3 µm, on the other hand, the average particle diameter of the second inert fine particles becomes too small, whereby the formed protrusions on the surface become too small and the friction coefficient of the film becomes high. As a result, when the film is rolled, its surface has debris, which make it difficult to roll the film nicely. The content of the second inert fine particles is 0.1 to 0.8 wt %, preferably 0.15 to 0.5 wt %, more preferably 0.2 to 0.3 wt %. When the content is smaller than 0.1 wt %, the friction coefficient of the film becomes high. As a result, when the film is rolled, its surface has debris, which make it difficult to roll the film nicely. When the content is larger than 0.8 wt %, on the other hand, the surface roughness becomes high and satisfactory electromagnetic conversion characteristics cannot be obtained.

The biaxially oriented laminated polyester film of the present invention may or may not contain inert fine particles in the second polyester layer. That is, the inert fine particles (third inert fine particles) which may be contained have an average particle diameter of 0.05 to 0.2 µm, preferably 0.1 to 0.2 µm. The content of the inert fine particles is 0 to 0.1 wt %, and when they are contained, the content thereof is preferably 0.005 to 0.1 wt %, more preferably 0.01 to 0.05 wt %. When the average particle diameter is smaller than 0.05 µm or the content is smaller than 0.005 wt %, the flat surface becomes too even and the friction coefficient of the film with a metal roll becomes too high, so that the film does not run very smoothly or is wrinkled, that a magnetic layer cannot be formed nicely, or that the film cannot be calendered well. Therefore, in this case, a coating layer is preferably formed on the film as will be described hereinafter. When the average particle diameter is more than 0.2 µm or the content is larger than 0.1 wt %, on the other hand, satisfactory electromagnetic conversion characteristics cannot be obtained.

As for the surface roughness of the exposed surface of the biaxially oriented laminated polyester film of the present invention, the center plane average roughness (WRaA) of the first polyester layer is 4 to 15 nm, preferably 6 to 15 nm, more preferably 6 to 14 nm, much more preferably 8 to 13 nm, while the 10-point average roughness (WRzA) thereof is 100 to 200 nm, preferably 100 to 160 nm, more preferably 100 to 140 nm. When the film is rolled with the WRaA of less than 4 nm, the slipperiness of the film deteriorates and the surface of the film has debris, which make it difficult to roll the film nicely. When the WRaA is more than 15 nm, on the other hand, protrusions push up the flat smooth surface in the calendering step and are transferred to the magnetic layer in the curing step, thereby roughening the surface of the magnetic layer and deteriorating electromagnetic conversion characteristics. When WRzA is less than 100 nm, air squeezability deteriorates and the film has vertical wrinkles, which make it difficult to roll the film nicely. When the WRzA is more than 200 nm, on the other hand, the protrusions push up the flat smooth surface in the calendering step and are transferred to the magnetic layer in the curing step, thereby roughening the surface of the magnetic layer and deteriorating electromagnetic conversion characteristics.

In the biaxially oriented laminated polyester film, the center plane average roughness (WRaB) of the exposed surface of the second polyester is 0.5 to 3.5 nm, preferably 1 to 3.5 nm, more preferably 1 to 3.0 nm, much more preferably 1 to 2.5nm, while the 10-point average roughness (WRzB) thereof is 10 to 80 nm, preferably 20 to 80 nm, more preferably 10 to 60 nm and much more preferably 10 to 50 nm. When the WRaB is less than 0.5 nm or the WRzB is less than 10 nm, the surface of the film is readily scratched at the time of film formation and chippings are adhered to the surface of the film. The chippings are liable to cause an increase in the number of dropouts when a tape is formed from the obtained film. When the WRaB is more than 3.5 nm or the WRzB is more than 80 nm, on the other hand, the surface of a magnetic layer becomes rough at the time of the magnetic layer formation, thereby deteriorating electromagnetic conversion characteristics.

In the biaxially oriented laminated polyester film of the present invention, the total number of protrusions of the first polyester layer is preferably $1 \times 10^4$/mm$^2$ or more, more preferably $1.4 \times 10^4$/mm$^2$ or more and the height of a protrusion at a cumulative number of protrusions of 30/mm$^2$ thereof is preferably 20 to 50 nm, more preferably 30 to 50 nm. The height of a protrusion at a cumulative number of protrusions of 30/mm$^2$ of the second polyester layer is preferably 20 nm or less, more preferably 15 nm or less.

When the total number of protrusions of the first polyester layer (rough surface side) is less than $1 \times 10^4$/mm$^2$, the friction coefficient of the film becomes high. As a result, when the film is rolled, its surface has debris, which make it difficult to roll the film nicely. Further, when the height of a protrusion at a cumulative number of protrusions of 30/mm$^2$ of the first polyester layer is less than 20 nm, sufficient air squeezability is not easily obtained. As a result, when the film is rolled, the surface thereof has vertical wrinkles, which make it difficult to roll the film nicely. On the other hand, when the height is more than 50 nm, many high protrusions are formed, push up the flat surface in the tape processing step and are transferred to the magnetic layer, thereby roughening the surface of the magnetic layer and making it difficult to obtain satisfactory electromagnetic conversion characteristics.

In the biaxially oriented laminated polyester film of the present invention, the ratio of the thickness $t_1$ of the first polyester layer to the average particle diameter $\overline{d}$ of the first and second inert fine particles contained in the first polyester layer is preferably 1 to 25, more preferably 10 to 25, much more preferably 10 to 20, particularly preferably 10 to 15. When this ratio is smaller than 1, the particles easily fall off and the base is readily abraded, while when the ratio is larger than 25, the surface of the second polyester layer on a side opposite to the first polyester layer is roughened by the influence of the particles contained in the first polyester layer, thereby deteriorating electromagnetic conversion characteristics.

When the height of a protrusion at a cumulative number of protrusions of 30/mm$^2$ of the second polyester layer is more than 20 nm, the surface of the magnetic layer becomes rough, thereby making it difficult to obtain satisfactory electromagnetic conversion characteristics.

Conditions such as the surface roughness of the second polyester layer and the cumulative number of protrusions can be satisfied by controlling the thickness of the first polyester layer, the sizes and amounts of the first and second inert fine particles to be contained in the first polyester layer, controlling the thickness of the second polyester layer and the size and amount of the third inert fine particles to be contained in the second polyester layer and, further, controlling stretching conditions.

In the biaxially oriented laminated polyester film of the present invention, the friction coefficient between the first polyester layer and the second polyester layer is 0.5 or less, preferably 0.45 or less, more preferably 0.4 or less. If the friction coefficient is more than 0.5, when the film is to be rolled, its surface has debris, which makes it difficult to roll it nicely.

The first, second and third inert fine particles contained in the first polyester layer and the second polyester layer in the present invention are preferably spherical inert fine particles having a particle diameter ratio (long diameter/short diameter) of 1.0 to 1.2. The spherical inert particles are preferably inorganic particles such as spherical silica or spherical heat resistant polymer particles. Illustrative examples of the spherical heat resistant polymer particles include crosslinked polystyrene resin particles, crosslinked silicon resin particles, crosslinked acrylic resin particles, crosslinked styrene-acrylic resin particles, crosslinked polyester resin particles, polyimide particles and melamine resin particles. When crosslinked polystyrene resin particles and crosslinked silicon resin particles are used out of the heat resistant polymer particles, the effect of the present invention appears more prominently advantageously.

The first polyester layer preferably contains fourth inert fine particles having a smaller average particle diameter than the average particle diameters of the first and second inert fine particles. The fourth inert fine particles have an average particle diameter of 0.1 $\mu$m or less, preferably 0.04 to 0.1 $\mu$m and are preferably spherical silica or heat resistant polymer particles. When the fourth inert fine particles are contained, the friction coefficient of the film can be lowered and the film is less apt to be scratched by its contact with a pass roll in the film-formation step or tape-formation step. The content of the fourth inert fine particles is 0.005 to 1.0 wt %, preferably 0.01 to 0.8 wt %, more preferably 0.1 to 0.5 wt %.

In the biaxially oriented laminated polyester film of the present invention, the friction coefficients of the surfaces of the first polyester layer and the second polyester layer with a metal are each preferably 0.4 or less, more preferably 0.35 or less, much more preferably 0.30 or less. When the friction coefficient is more than 0.4, the slipperiness of the film with a metal roll in the tape-formation step deteriorates, so that the film sticks to the metal roll to cause wrinkles, that a magnetic layer or BC layer cannot be formed easily, or that it makes it difficult to calender the film in the calendering step.

The friction coefficient ($\mu$kA) of the first polyester layer with the metal roll and the friction coefficient ($\mu$kB) of the second polyester layer with the metal roll preferably satisfy the following expression.

$$\mu kA \geq \mu kB$$

When an attempt is made to make the friction coefficient ($\mu$kA) of the first polyester layer smaller than the friction coefficient ($\mu$kB) of the second polyester layer, the surface of the first polyester layer must be roughened, or a coating layer containing inert fine particles must be formed on the first polyester layer as is done on the second polyester layer.

However, in the former case, the surface of the first polyester layer becomes too rough and the surface of the magnetic layer in the calendering step or curing step becomes rough, thereby deteriorating electromagnetic conversion characteristics. In the latter case, since the coating layer is formed on the first polyester layer and the second polyester layer, blocking occurs when the film is exposed to high temperatures during its storage or transportation, whereby the film can no longer be used.

In the biaxially oriented laminated polyester film of the present invention, a cover layer consisting essentially of a water-dispersible copolyester resin and inert fine particles having an average particle diameter of 0.01 to 0.05 $\mu$m may be formed on the second polyester layer.

The water-dispersible copolyester resin is not particularly limited but preferably comprises 40 to 99 mol % of 2,6-naphthalenedicarboxylic acid, 0.1 to 5 mol % of an aromatic dicarboxylic acid having a sulfonate group and 0 to 55 mol % of other aromatic dicarboxylic acid as acid components, and 40 to 100 mol % of ethylene glycol and other glycol containing 0 to 66 mol % of a lower alkylene oxide adduct of bisphenol A as glycol components.

The inert fine particles have an average particle diameter of 0.01 to 0.05 $\mu$m, preferably 0.01 to 0.04 $\mu$m, more preferably 0.01 to 0.03$\mu$m. When the average particle diameter is smaller than 0.01 $\mu$m, the particles are too small in size, so that the friction coefficient of the film cannot be reduced. When the average particle diameter is larger than 0.05 $\mu$m, on the other hand, the particles are too large in size and readily fall off, thereby causing a drop out when a tape is formed from the film disadvantageously.

Further, the biaxially oriented laminated polyester film of the present invention has a Young's modulus in a longitudinal direction of preferably 500 to 1000 kg/mm$^2$ (4904 to 9807 MPa), more preferably 500 to 900 kg/mm$^2$ (4904 to 8826 MPa), particularly preferably 500 to 750 kg/mm$^2$ (4904 to 7355 MPa), and a Young's modulus in a transverse direction of preferably 500 to 1,400kg/mm$^2$ (4904 to 7355 MPa), more preferably 600 to 1,300 kg/mm$^2$ (5884 to 12749 MPa), particularly preferably 700 to 1,250 kg/mm$^2$ (6865 to 12259MPa). The total of Young's moduli in longitudinal and transverse directions is preferably 1,300 to 2,000 kg/mm$^2$ (12749 to 19614 MPa), more preferably 1,400 to 1,800 kg/mm$^2$ (13730 to 17653 MPa).

When the Young's modulus in a longitudinal direction is smaller than 500 kg/mm$^2$ (4904 MPa), the strength in a longitudinal direction of a magnetic tape is apt to be low. Therefore, when strong force is applied to the magnetic tape in a longitudinal direction at the time of recording or reproduction, the magnetic tape is easily broken. When the Young's modulus in a transverse direction is smaller than 500 kg/mm$^2$ (4904 MPa), the strength in a transverse direction of the magnetic tape is apt to be low, a contact between the tape and the magnetic head is weak, and satisfactory electromagnetic conversion characteristics are not easily obtained. When the Young's modulus in a longitudinal direction is larger than 1,000 kg/mm$^2$ (9807 Mpa), the strength in a transverse direction lowers, a contact between the tape and the magnetic head is weak, and satisfactory electromagnetic conversion characteristics are not easily obtained. When the Young's modulus in a transverse direction is larger than 1,400 kg/mm$^2$ (13730 MPa), the strength in a longitudinal direction lowers. Therefore, when strong force is applied to the film in a longitudinal direction at the time of recording or reproduction, the film is easily broken. Further, when the total of Young's moduli in longitudinal and transverse directions is smaller than 1,300 kg/mm$^2$ (12749 MPa), a contact between the tape and the magnetic head is weak, and satisfactory electromagnetic conversion characteristics are not easily obtained. When the total is larger than 2,000 kg/mm$^2$ (19614 MPa), on the other hand, the stretch ratio becomes high at the time of film formation, whereby the film is easily broken and the product yield is liable to lower.

When the biaxially oriented laminated polyester film of the present invention is used as a tape for a helical magnetic recording medium, the Young's modulus in a transverse direction is preferably higher than that in a longitudinal direction to improve the contact between the tape and the magnetic tape.

When the biaxially oriented polyester film of the present invention is used as a tape for other magnetic recording medium, the film may have a higher Young's modulus in a longitudinal direction than that in a transverse direction.

Further, the first polyester layer and/or the second polyester layer in the present invention preferably comprise(s) polyethylene terephthalate or polyethylene-2,6-naphthalate, more preferably polyethylene-2,6-naphthalate. Particularly, when the total thickness of the film is 6 µm or more, they may comprise polyethylene terephthalate. When the thickness is smaller than 6 µm, however, polyethylene-2,6-naphthalate is preferable because it can increase the Young's modulus.

The biaxially oriented laminated polyester film of the present invention has a total thickness of preferably 2 to 10 µm, more preferably 3 to 7 µm, much more preferably 4 to 6 µm. When the thickness is smaller than 2 µm, the thickness of the film is so small that the film is frequently broken at the time of film formation, and the winding properties of the film become too unsatisfactory to obtain a good film roll easily. Further, the thickness of the flat layer becomes small, so that the rough surface has a greater influence upon the surface properties of the even surface and satisfactory surface properties are hardly obtained for the even surface. When the thickness is larger than 10 µm, on the other hand, the thickness of the obtained tape is large, so that the length of a tape loaded in a cassette is short and a sufficient magnetic recording capacity is hardly obtained.

The biaxially oriented laminated polyester film of the present invention can be produced by conventionally known methods or methods stored in the industry. For example, it can be obtained by producing an unstretched laminated film first and stretching the film biaxially. This unstretched laminated film can be produced by methods for producing a laminated film that have been accumulated heretofore. For example, there can be employed a method in which a first polyester layer and a second polyester layer forming the opposite side are laminated together while the polyesters of the layers are molten or solidified by quenching. Stated more specifically, it can be produced by coextrusion, extrusion lamination and the like. The film laminated by the above methods can be formed into a biaxially oriented film in accordance with methods for producing a biaxially oriented polyester film that have been conventionally accumulated. For example, polyesters are molten and coextruded at a temperature of melting point (Tm; °C.) to (Tm+70)° C. to obtain an unstretched laminated film, which in turn is stretched to preferably 2.5 to 6.0 times, more preferably 3.0 to 5.5 times, particularly preferably 3.0 to 5.0 times uniaxially (longitudinal direction or transverse direction) at a temperature of (Tg−10) to (Tg+70)° C. (Tg; glass transition temperature of polyester) and then to preferably 3.5 to 7.5 times, more preferably 4.0 to 7.0 times, particularly preferably 4.5 to 6.5 times in a direction perpendicular to the above stretching direction (transverse direction when first stretched in a longitudinal direction) at a temperature of Tg to (Tg+70)° C. The obtained biaxially oriented film may be further stretched in a longitudinal direction and/or transverse direction as required. Thus, the total stretch ratio is preferably 9 times or more, more preferably 12 to 35 times, particularly preferably 15 to 30 times in terms of area stretch ratio. The biaxially oriented laminated film can be heat set at a temperature of (Tg+70) to (Tm−10)° C., for example 190 to 250° C., preferably 200 to 240° C. The heat setting time is preferably 1 to 60 seconds.

The biaxially oriented laminated polyester film of the present invention has excellent flatness, slipperiness and winding properties and is preferably used as a base film for high-density magnetic recording media, particularly for digital magnetic recording media.

A ferromagnetic metal thin film layer made of iron, cobalt, chromium or an alloy or oxide thereof is formed on the second polyester layer or the cover layer overlying the second polyester layer of the biaxially oriented laminated polyester film of the present invention by vacuum vapor deposition, sputtering, ion plating or the like, and a protective layer of diamond-like carbon (DLC) or the like and a fluorine-containing carboxylic acid-based lubricant layer are formed in turn on the surface of the ferromagnetic metal thin film layer according to purpose and application and as required. A known back coat layer is formed on the surface of the first polyester layer. Thereby, there can be obtained a high-density recording deposited magnetic recording medium having excellent electromagnetic conversion characteristics such as output at a short-wavelength range, S/N and C/N, few dropouts and a small error rate. This deposited electromagnetic recording medium is extremely useful as a tape medium for Hi8 for analog signal recording and for digital video cassette recorders (DVC), data 8 mm and DDSIV for digital signal recording.

A metal-coated magnetic recording medium for high-density recording which has excellent electromagnetic conversion characteristics such as output at a short-wavelength range, S/N and C/N, few dropouts and a small error rate can be obtained from the biaxially oriented laminated polyester film of the present invention by uniformly dispersing needle-like fine magnetic iron powder or that containing iron as a main component into a binder such as polyvinyl chloride or vinyl chloride-vinyl acetate copolymer and applying the obtained dispersion to the surface of the second polyester layer or cover layer overlying the second polyester layer to form a magnetic layer having a thickness of 1 µm or less, preferably 0.1 to 1 µm. A non-magnetic layer may be formed underneath the metal powder-containing magnetic layer by dispersing fine titanium oxide particles in the same organic binder as that of the magnetic layer as required. This metal-coated magnetic recording medium is extremely useful as a magnetic tape for 8-mm video, Hi8, β-cam SP and W-VHS for analog signal recording and for digital video cassette recorders (DVC), data 8 mm, DDSIV, digital β-cam, D2, D3 and SX for digital signal recording.

Further, a coated magnetic recording medium for high-density recording which has excellent electromagnetic conversion characteristics such as output at a short-wavelength range, S/N and C/N, few drop outs and a small error rate can be obtained from the biaxially oriented laminated polyester film of the present invention by uniformly dispersing needle-like fine magnetic powder composed essentially of iron oxide or chromium oxide or leaf-like fine magnetic powder such as barium ferrite in a binder such as polyvinyl chloride or vinyl chloride-vinyl acetate copolymer and applying the obtained dispersion to the surface of the second polyester layer or cover layer overlying the second polyester layer to form a magnetic layer having a thickness of 1 µm or less, preferably 0.1 to 1 µm. A non-magnetic layer may be optionally formed on this layer B as a layer underlying the oxide-containing magnetic layer by dispersing fine titanium oxide particles in the same organic binder as that of the magnetic layer and applying the obtained dispersion to the surface of the magnetic layer as required. This oxide-coated magnetic recording is useful as a high-density oxide-coated magnetic recording medium for data streamer QIC for digital signal recording.

The above W-VHS is a VTR for analog HDTV signal recording and DVC can be used for digital HDTV signal recording. It can be said that the film of the present invention is a base film extremely useful for magnetic recording media for HDTV-compatible VTRs.

The following examples are provided for the purpose of further illustrating the present invention but are in no way to be taken as limiting. Various properties in the examples were measured in accordance with the following methods.

(1) Average Particle Diameter ($\bar{d}$) of Inert Fine Particles (A) Particles Added to Polyester Film This is measured using the CP-50 centrifugal particle size analyzer of Shimadzu Corporation. A particle diameter equivalent to 50 mass percent is read from a cumulative curve of the particles of each diameter and the amount thereof that is calculated based on the obtained centrifugal sedimentation curve, and taken as the average particle diameter (refer to "Book of Particle Size Measurement Technology" issued by Nikkan Kogyo Press, pp. 242–247, 1975).

(B) Particles Contained in Biaxially Oriented Polyester Film

The polyester is removed from the film by a low-temperature plasma ashing process (for example, the PR-503 of Yamato Kagaku Co., Ltd.) to expose particles. The process conditions to be selected are such that the polyester is ashed while the particles are not damaged. The exposed particles are observed under a SEM (Scanning Electron Microscope) to analyze an image (light and shade formed by the particles) of the particles with an image analyzer (for example, QTM900 of Cambridge Instrument Co., Ltd.). The numerical processing of the following equation (1) is carried out with 5,000 or more particles by changing the observation site and the obtained number average particle diameter $\bar{d}$ is taken as the average particle diameter.

$$\bar{d} = \Sigma \bar{d}_i / n \quad (1)$$

wherein $\bar{d}_i$ is the circle equivalent diameter of the particles and n is the number of the particles.

(C) Colloidal Particles Added to Coating Layer

The average particle diameter of colloidal particles is calculated using the Luzex 500 image analyzer (Nippon Regulator Co., Ltd.) by photographing each particle at a magnification corresponding to the size of the particle with a scanning electron microscope.

(2) Content of Particles

A solvent which dissolves the polyester but does not dissolve the particles is selected, the particles are separated from the polyester by centrifugation, and the ratio (wt %) of the weight of the particles to the total weight is taken as the content of the particles. Use of infrared spectroscopic analysis in combination is effective in some cases.

(3) Layer Thickness

Using a secondary ion mass spectrometer (SIMS), the concentration ratio of an element derived from the highest concentration particle out of particles contained in the film portion from the surface to a depth of 3,000 nm to the carbon element of the polyester ($M^+/C^+$) is taken as a particle concentration, and the portion from the surface to a depth of 3,000 nm is analyzed in the thickness direction. The particle concentration of the surface layer is low because it is an interface, whereas it becomes higher as the distance from the surface increases. The particle concentration begins to decrease again once it reaches the maximal value. Based on this concentration distribution curve, a depth (larger than a depth at which the particle concentration becomes maximum) at which a surface layer particle concentration is equal to a half of the maximum value is taken as the thickness of the surface layer. Conditions are as follows.

(1) Measurement Apparatus secondary ion mass spectrometer (SIMS)

(2) Measurement Conditions type of primary ions: $O_2^+$ primary ion acceleration voltage: 12 KV primary ion current: 200 nA luster area: 400 µm☐ analytical area: 30% of gate measurement vacuum degree: $6.0 \times 10^{-3}$ Torr

E-GUN: 0.5 KV–3.0 A

When the particles which are contained in the largest quantity in an area from the surface layer to a depth of 3,000 nm are organic polymer particles, it is difficult to measure them with SIMS. Therefore, the same depth profile as described above may be measured by XPS (X-ray photoelectron spectrometry), IR (infrared spectrometry) or the like while etching from the surface to obtain the thickness of the surface layer.

(4) Young's Modulus

The film is cut to a width of 10 mm and a length of 15 cm, and this sample is pulled by an Instron-type universal tensile tester at a chuck interval of 100 mm, a pulling rate of 10 mm/min and a chart rate of 500mm/min. The Young's modulus is calculated from the tangent of a rising portion of the obtained load-elongation curve.

(5) Surface Roughness (WRa, WRz)

Using the non-contact 3-D roughness meter (NT-2000) of WYKO Co., Ltd., measurements are made for the measurement number (n) of 10 or more under such conditions as a measurement magnification of 40× and a measurement area of 246.6 µm×187.5 µm (0.0462 mm²), and the center plane average roughness (WRa) and 10-point average roughness (WRz) are calculated with the surface analysis software incorporated in the roughness meter.

(A) Center Plane Average Roughness (WRa)

$$WRa = \sum_{k=1}^{m} \sum_{j=1}^{n} |Z_{jk} - \bar{Z}| / (m \cdot n)$$

$$\text{provided } \bar{Z} = \sum_{k=1}^{m} \sum_{j=1}^{n} Z_{jk} / (m \cdot n)$$

$Z_{jk}$ is a height on a 2-D roughness chart at a j-th position and a k-th position in a measurement direction (246.6 µm) and a direction perpendicular to the measurement direction (187.5 µm) when these directions are divided into m and n sections, respectively.

(B) 10-Point Average Roughness (WRz)

The average roughness WRz is obtained by averaging the roughnesses of the highest 5 peaks (Hp) and the lowest 5 valleys (Hv).

$$WRz=[(H_{p1}+H_{p2}+H_{p3}+H_{p4}+H_{p5})-(H_{v1}+H_{v2}+H_{v3}+H_{v4}+H_{v5})]\times 1/5$$

(6) total number of protrusions and protrusion distribution

Using the non-contact 3-D roughness meter (TOPO-3D) of WYKO Co., Ltd., 10 or more measurements (n=10) are made under such conditions as a measurement magnification of 40× and a measurement area of 242 $\mu$m×239 $\mu$m (0.058 mm$^2$), and the average number of protrusions having a height of at least Hi ($\mu$m) per mm$^2$ is obtained with the surface protrusion analysis software incorporated in the roughness meter and taken as Yi (per mm$^2$) to obtain a cumulative protrusion distribution curve.

The maximum number of protrusions $Y_{max}$ (per mm$^2$) where the cumulative protrusion distribution curve reaches saturation is taken as the total number of protrusions.

(7) Winding Properties

Figure 1:
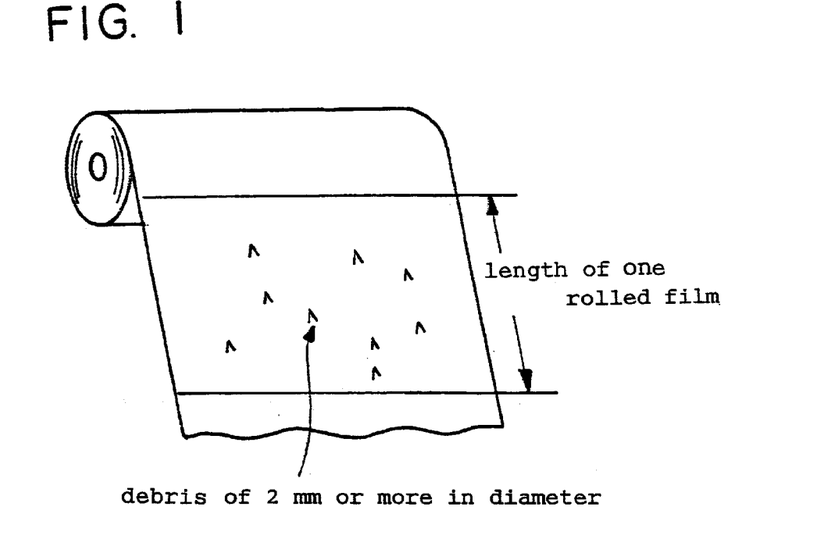
FIG. 1 is a diagram showing the formation of debris on the surface when a film is rolled.
Figure 2:
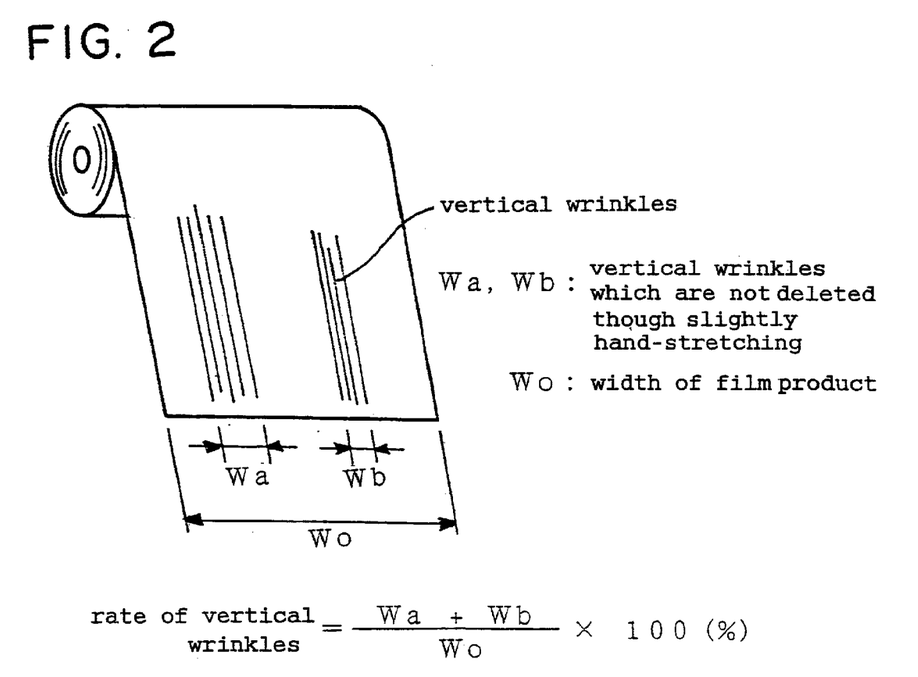
FIG. 2 is a diagram showing the formation of vertical wrinkles in the film and the mathematical expression for determining the rate of the vertical wrinkles.

The number of debris of 2 mm or more in diameter (see FIG. 1) and the formation of vertical wrinkles (see FIG. 2) are measured when a 6,000-m-long film is rolled to a width of 1,000 mm, and the number of debris per min width is calculated. The average value per roll when 10 films are rolled is obtained and evaluated as follows.

A) debris

◎: 0 to 2 debris/m

○: 3 to 5 debris/m

Δ: 6 to 10 debris/m

X: 11 or more debris/m (B) vertical wrinkles

◎: 0 to less than 10%

○: 10 to less than 20%

Δ: 20 to less than 30%

X: 30 % or more (8) Film Thickness

Ten films are placed one upon another in such a manner that dust should not be inserted therebetween and the total thickness of the films is measured by an intermittent electronic micrometer to calculate the thickness of each film.

(9) Running Properties

Wrinkling caused by poor slipperiness between the smooth surface of the film and the metal roll in the magnetic layer-forming step or the calendering step when a tape is formed from a film roll having a width of 1,000 mm is evaluated as follows.

◎: not wrinkled

○: slightly wrinkled but has no problem in the steps

Δ: wrinkled but can be used in the steps

X: severely wrinkled and cannot be used (10) Electromagnetic Conversion Characteristics (A) Examples 1 to 5 and Comparative Examples 1 to 8

The following commercial device is used to record a signal having a frequency of 7.4 MHz, the ratio of a 6.4-MHz value to a 7.4-MHz value of its reproduction signal is taken as the C/N of the tape, and relative C/N values are obtained with the C/N of Example 1 being 0 dB.

◎: 0 dB or more

○: −2 to less than 0 dB

X: less than −2 dB

The following devices are used.

8-mm video recorder: EDV-6000 of Sony Corp.

C/N measurement: noise meter of Shibasoku Co., Ltd.

(B) Examples 6 to 9 and Comparative Examples 9 to 12

The following commercial device is used to record a signal having a frequency of 7.4 MHz, the ratio of a 6.4-MHz value to a 7.4-MHz value of its reproduction signal is taken as the C/N of the tape, and relative C/N values are obtained with the C/N of Comparative Example 13 being 0 dB.

◎: +3 dB or more

○: +1 to less than +3 dB

X: less than +1 dB (C) Examples 10 to 12 and Comparative Example 13

The following commercial device is used to record a signal having a frequency of 7.4 MHz, the ratio of a 6.4-MHz value to a 7.4-MHz value of its reproduction signal is taken as the C/N of the tape, and relative C/N values are obtained with the C/N of Comparative Example 13 being 0 dB.

◎: +3 dB or more

○: +1 to less than +3 dB

X: less than +1 dB

The following devices are used.

8-mm video recorder: EDV-6000 of Sony Corp.

C/N measurement: noise meter of Shibasoku Co., Ltd.

(11) Friction Coefficient of Film

A fixed glass plate is placed under two films which are held together, the lower film (in contact with the glass plate) is pulled with a constant-speed roll (about 10 cm/min), and a detector is fixed to one end of the upper film (opposite end to the pulling direction of the lower film) to detect tensile force between the films at the time of start. The sled having a weight of 1 kg and a lower side area of 100 cm$^2$ is used at this point. The friction coefficient ($\mu$s) is obtained from the following equation.

$$\mu s=\text{(tensile force at the time of start (kg))/(load of 1 kg)}$$

12) Friction Coefficient $\mu$k of Film with Metal

The surface of a polyester layer A or the surface of polyester layer B is moved (subjected to friction) at a speed of 200 cm/min with the surface in contact with an SUS rod of 3 mm in diameter at an angle θ=π radian (180° C.) at a temperature of 20° C. and a humidity of 60%. The outlet tension (T$_2$: g) is detected with the detector after the film runs 6 m when the tension controller 2 is adjusted such that the inlet tension T$_1$ should be 35 g, and the running friction coefficient $\mu$k is calculated from the following equation. This measurement is carried out 10 times and the average of measurement values is taken.

$$\mu k=(2.303/\theta)\log(T_2/T_1)=0.733 \log(T_2/35)$$

EXAMPLES 1 TO 4 AND COMPARATIVE EXAMPLES 1 TO 8

Dimethyl-2,6-naphthalate and ethylene glycol were polymerized by adding manganese acetate as an ester interchange catalyst, antimony trioxide as a polymerization catalyst, phosphorous acid as a stabilizer and particles shown in Table 1 as a lubricant in accordance with a commonly used method to obtain polyethylene-2,6-naphthalates (PEN) for layers A and B having an intrinsic viscosity (measured in o-chlorophenol at 35° C.) of 0.61 dl/g.

The pellets of the polyethylene-2,6-naphthalates were dried at 170° C. for 6 hours, supplied into the hoppers of two extruders, molten at 280 to 300° C. and laminated together using a multi-manifold coextrusion die in such a manner that a first layer was placed on one side of a second layer, and the obtained laminate was subjected to a surface finishing of about 0.3 s and extruded onto a rotary cooling drum having a surface temperature of 60° C. to obtain a 105-$\mu$m-thick unstretched laminated film.

This unstretched laminated film was preheated at 120° C., stretched to 4.0 times between low-speed and high-speed rolls by heating with an IR heater having a surface temperature of 900° C. from 15 mm above, quenched and supplied to a stenter to be stretched to 5.0 times in a transverse direction at 145° C. The obtained biaxially oriented film was heat set with hot air at 210° C. for 4 seconds to obtain a 5.2-μm-thick biaxially oriented laminated polyester film. This film had a Young's modulus in a longitudinal direction of 600 kg/mm² (5884 MPa) and a Young's modulus in a transverse direction of 900 kg/mm² (8826 MPa).

A magnetic tape was produced as follows.

That is, the following composition was placed in a ball mill, kneaded for 16 hours and dispersed, and 5 parts by weight of an isocyanate compound (Desmodule L of Bayer AG) was added and dispersed by high-speed shearing for one hour to obtain a magnetic coating.

Composition of Magnetic Coating:

| | |
|---|---|
| needle-like Fe particles | 100 parts |
| vinyl chloride-vinyl acetate copolymer (Eslec 7A of Sekisui Chemical Co., Ltd.) | 15 parts |
| thermoplastic polyurethane resin | 5 parts |
| chromium oxide | 5 parts |
| carbon black | 5 parts |
| lecithin | 2 parts |
| fatty acid ester | 1 part |
| toluene | 50 parts |
| methyl ethyl ketone | 50 parts |
| cyclohexanone | 50 parts |

This magnetic coating was applied to one side (second layer) of the above biaxially oriented laminated polyester film to a thickness of 0.5 μm, aligned in a DC magnetic field of 2,500 Gauss and dried by heating at 100° C., and the resulting film was supercalendered (linear pressure of 300 kg/cm, temperature of 80° C.) and rolled. This roll was kept in an oven heated at 55° C. for three days and cut to a width of 8 mm to obtain a magnetic tape.

EXAMPLE 5

A biaxially oriented laminated polyester film was obtained in the same manner as in Example 1 except that particles shown in Table 1 were added to the first polyester layer and the second polyester layer and that the stretch ratios in longitudinal and transverse directions were changed so that the Young's modulus in a longitudinal direction of the film is to be 550 kg/mm² (5394 MPa) and the Young's modulus in a transverse direction is to be 1,200 kg/mm² (11768 MPa). A magnetic tape was then obtained in the same manner as in Example 1.

TABLE 1

| Young's modulus | unit | Examples | | | | |
|---|---|---|---|---|---|---|
| | | 1 | 2 | 3 | 4 | 5 |
| longitudinal direction | kg/mm² (MPa) | 600 (5884) | 600 (5884) | 600 (5884) | 600 (5884) | 550 (5394) |
| transverse direction | kg/mm² (MPa) | 900 (8826) | 900 (8826) | 900 (8826) | 900 (8826) | 1,200 (11768) |
| first polyester layer | | | | | | |
| first inert fine particles | | | | | | |
| type | — | spherical silica | spherical silica | spherical silica | spherical silica | crosslinked silicon resin |
| average particle diameter | μm | 0.3 | 0.3 | 0.3 | 0.2 | 0.4 |
| quantity | wt % | 0.25 | 0.25 | 0.15 | 0.4 | 0.1 |
| second inert fine particles | | | | | | |
| type | — | spherical silica | spherical silica | spherical silica | spherical silica | spherical silica |
| average particle diameter | μm | 0.12 | 0.12 | 0.12 | 0.1 | 0.12 |
| quantity | wt % | 0.23 | 0.15 | 0.28 | 0.7 | 0.3 |
| fourth inert fine particles | | | | | | |
| type | — | — | — | spherical silica | — | — |
| average particle diameter | μm | — | — | 0.05 | — | — |
| quantity | wt % | — | — | 0.3 | — | — |
| second polyester layer | | | | | | |
| third inert fine particles | | | | | | |
| type | — | spherical silica | spherical silica | spherical silica | spherical silica | spherical silica |
| average particle diameter | μm | 0.12 | 0.12 | 0.05 | 0.12 | 0.15 |
| quantity | wt % | 0.01 | 0.03 | 0.08 | 0.05 | 0.05 |
| surface roughness | | | | | | |
| first polyester layer | | | | | | |
| WRa | nm | 8.9 | 8.7 | 7.7 | 10.6 | 5.2 |
| total number of protrusions | 10⁴ per mm² | 1.9 | 1.4 | 1.7 | 2.5 | 1.2 |
| height of protrusion | nm | 34 | 34 | 33 | 25 | 48 |
| second polyester layer | | | | | | |
| WRa | nm | 1.5 | 2.3 | 0.9 | 2.7 | 2.1 |
| height of protrusion | nm | 10 | 12 | 8 | 15 | 11 |
| friction coefficient | — | 0.35 | 0.45 | 0.4 | 0.38 | 0.46 |

TABLE 1-continued

| roll form | | | | | | | | |
|---|---|---|---|---|---|---|---|---|
| debris | — | ◎ | ○ | ◎ | ◎ | ○ | | |
| vertical wrinkles | — | ◎ | ○ | ○ | ○ | ○ | | |
| electromagnetic conversion characteristics | — | ◎ | ○ | ◎ | ○ | ○ | | |
| running properties | — | ○ | ◎ | ○ | ◎ | ◎ | | |

| | | Comparative Examples | | | | | | | |
|---|---|---|---|---|---|---|---|---|---|
| Young's modulus | unit | 1 | 2 | 3 | 4 | 5 | 6 | 7 | 8 |
| longitudinal direction | kg/mm² (MPa) | 600 (5884) | 600 (5884) | 600 (5884) | 600 (5884) | 600 (5884) | 600 (5884) | 600 (5884) | 600 (5884) |
| transverse direction | kg/mm² (MPa) | 900 (8826) | 900 (8826) | 900 (8826) | 900 (8826) | 900 (8826) | 900 (8826) | 900 (8826) | 900 (8826) |
| first polyester layer first inert fine particles | | | | | | | | | |
| type | — | crosslinked silicon resin | crosslinked silicon resin | spherical silica | spherical silica | spherical silica | spherical silica | spherical silica | spherical silica |
| average particle diameter | μm | 0.5 | 0.5 | 0.15 | 0.3 | 0.3 | 0.3 | 0.3 | 0.3 |
| quantity | wt % | 0.01 | 0.1 | 0.25 | 0.5 | 0.25 | 0.25 | 0.25 | 0.25 |
| second inert fine particles | | | | | | | | | |
| type | — | spherical silica | spherical silica | spherical silica | spherical silica | spherical silica | spherical silica | spherical silica | spherical silica |
| average particle diameter | μm | 0.12 | 0.12 | 0.12 | 0.12 | 0.12 | 0.12 | 0.12 | 0.12 |
| quantity | wt % | 0.3 | 0.3 | 0.3 | 0.3 | 0.05 | 0.9 | 0.23 | 0.23 |
| fourth inert fine particles | | | | | | | | | |
| type | — | — | — | — | — | — | — | — | — |
| average particle diameter | μm | — | — | — | — | — | — | — | — |
| quantity | wt % | | | | | | | | |
| second polyester layer third inert fine particles | | | | | | | | | |
| type | — | spherical silica | spherical silica | spherical silica | spherical silica | spherical silica | spherical silica | spherical silica | spherical silica |
| average particle diameter | μm | 0.12 | 0.12 | 0.12 | 0.12 | 0.12 | 0.12 | 0.04 | 0.12 |
| quantity | wt % | 0.01 | 0.01 | 0.01 | 0.01 | 0.01 | 0.01 | 0.01 | 0.12 |
| surface roughness first polyester layer | | | | | | | | | |
| WRa | nm | 5.8 | 8.9 | 4.5 | 11.8 | 8.3 | 12.2 | 8.9 | 8.9 |
| total number of protrusions | 10⁴ per mm² | 0.9 | 1.5 | 1.0 | 2.4 | 0.8 | 2.0 | 1.9 | 1.9 |
| height of protrusion | nm | 43 | 51 | 17 | 39 | 33 | 35 | 32 | 32 |
| second polyester layer | | | | | | | | | |
| WRa | nm | 1.5 | 1.5 | 1.5 | 1.5 | 1.5 | 1.5 | 0.6 | 4.7 |
| height of protrusion | nm | 10 | 10 | 10 | 10 | 10 | 10 | 6 | 20 |
| friction coefficient | — | 0.61 | 0.46 | 0.50 | 0.30 | 0.70 | 0.30 | 0.38 | 0.32 |
| roll form | | | | | | | | | |
| debris | — | x | ○ | ○ | ◎ | x | ◎ | ○ | ◎ |
| vertical wrinkles | — | ○ | ◎ | x | ◎ | ○ | ◎ | ◎ | ◎ |
| electromagnetic conversion characteristics | — | ○ | x | ○ | x | ○ | x | ◎ | x |
| running properties | — | ○ | ○ | ○ | ○ | ○ | ○ | x | ◎ |

As is obvious from Table 1, the films of Examples 1 to 5 show excellent electromagnetic conversion characteristics and have excellent winding properties and running properties.

EXAMPLES 6 TO 8 AND COMPARATIVE EXAMPLE 12

Production of Copolyester Resin

An ester interchange reaction was carried out by charging 90 parts of dimethyl 2,6-naphthalene dicarboxylate, 6 parts of dimethylisophthalate, 4 parts of 5-sodium sulfoisophthalic acid, 70 parts of ethylene glycol and 30 parts of an ethylene oxide adduct of bisphenol A represented by the following structural formula into an ester interchange reactor, adding 0.05 part of tetrabutoxy titanium, heating the resulting mixture at 230° C. in a nitrogen atmosphere, and distilling off the formed methanol.

(m+n=4 (average value))

After 0.6 part of Irganox 1010 (of Ciba Geigy Co., Ltd.) was added to this reaction system, the temperature was gradually elevated to 255° C. and the internal pressure of the system was reduced to 1 mmHg to carry out a polycondensation reaction so as to obtain a copolyester resin having an intrinsic viscosity of 0.64. The composition of this copolyester resin is shown in Table 2.

Preparation of Polyester Water Dispersion

There was dissolved 20 parts of this copolyester resin in 80 parts of tetrahydrofuran, and 180 parts of water was added dropwise to the obtained solution under high-speed agitation at 10,000 rpm to obtain a bluish semi-opaque dispersion. Thereafter, this dispersion was distilled at a reduced pressure of 20 mmHg to remove tetrahydrofuran. Thus, a polyester water dispersion having a solid content of 10 wt % was obtained.

An aqueous coating solution (solid content of 1.8 wt %) was prepared that comprises 100 parts of the obtained polyester water dispersion, 20 parts of colloidal particles having an average particle diameter of 25 nm shown in Table 2 and 14 parts of polyoxyethylene nonylphenyl ether having an HLB of 12.8 as a surfactant.

Preparation of Biaxially Oriented Polyester Film

Dimethyl-2,6-naphthalate and ethylene glycol were polymerized by adding manganese acetate as an ester interchange catalyst, antimony trioxide as a polymerization catalyst, phosphorous acid as a stabilizer and particles shown in Table 2 as a lubricant in accordance with a commonly used method to obtain polyethylene-2,6-naphthalates (PEN) for first and second layers having an intrinsic viscosity (o-chlorophenol, 35° C.) of 0.61.

The pellets of the polyethylene-2,6-naphthalates were dried at 170° C. for 6 hours, supplied into the hoppers of two extruders, molten at 280 to 300° C. and laminated together using a multi-manifold coextrusion die in such a manner that a first layer was placed on one side of a second layer, and the obtained laminate was subjected to a surface finishing of about 0.3 s and extruded onto a rotary cooling drum having a surface temperature of 60° C. to obtain a 90 μm-thick unstretched laminated film.

The unstretched laminated film thus obtained was preheated at 120° C., stretched to 4.0 times between low-speed and high-speed rolls by heating with an IR heater having a surface temperature of 900° C. from 15 mm above and cooled, and the above prepared coating solution was applied onto the second polyester layer of the uniaxially stretched film in such an amount that the film has a thickness of 10 nm when dried. Thereafter, the film was supplied to a stenter to be stretched to 5.0 times in a transverse direction at 145° C. The obtained biaxially oriented film was heat set with hot air at 210° C. for 4 seconds to obtain a 4.5-μm-thick biaxially oriented laminated polyester film. The film had a Young's modulus in a longitudinal direction of 600 kg/mm² (5884 MPa) and a Young's modulus in a transverse direction of 900 kg/mm² (8826 MPa).

A magnetic tape was produced as follows.

The same magnetic coating as that used in Example 1 was applied to one side (second layer) of the biaxially oriented laminated polyester film to a thickness of 0.5 μm, aligned in a DC magnetic field of 2,500 Gauss and dried by heating at 100° C., and the resulting film was super-calendered (linear pressure of 300 kg/cm, temperature of 80° C.) and rolled. This roll was left in an oven at 55° C. for three days and cut to a width of 8 mm to obtain a magnetic tape. The results are shown in Table 2.

EXAMPLE 9

A biaxially oriented laminated polyester film was obtained in the same manner as in Example 6 except that particles shown in Table 2 were added to the first polyester layer and the second polyester layer and that the stretch ratios in longitudinal and transverse directions were changed so that the Young's modulus in a longitudinal direction of the film is to be 550 kg/mm² (5394 MPa) and that in a transverse direction is to be 1,200 kg/mm² (11768 MPa). Then, a magnetic tape was obtained in the same manner as in Example 6. The results are shown in Table 2.

COMPARATIVE EXAMPLES 9 AND 10

A magnetic tape was obtained in the same manner as in Example 6 except that particles shown in Table 2 were added to the first polyester layer and the second polyester layer and that a coating layer was not formed after uniaxial stretching. The results are shown in Table 2.

COMPARATIVE EXAMPLE 11

A magnetic tape was obtained in the same manner as in Example 6 except that particles shown in Table 2 were added to a single layer and that a coating layer was not formed after uniaxial stretching. The results are shown in Table 2.

TABLE 2

| | unit | Ex. 6 | Ex. 7 | Ex. 8 | Ex. 9 | C. Ex. 9 | C. Ex. 10 | C. Ex. 11 | C. Ex. 12 |
|---|---|---|---|---|---|---|---|---|---|
| layer structure | | two layers | two layers | two layers | two layers | two layers | two layers | single layer | two layers |
| first polyester layer | | | | | | | | | |
| first inert fine particles | | | | | | | | | |
| type | | spherical silica | crosslinked silicon resin particles | spherical silica | spherical silica | crosslinked silicon resin particles | crosslinked silicon resin particles | calcium carbonate | sperical silica |
| average particle diameter | μm | 0.3 | 0.5 | 0.3 | 0.3 | 0.5 | 0.5 | 0.6 | 0.1 |
| quantity | wt % | 0.25 | 0.02 | 0.35 | 0.25 | 0.02 | 1.0 | 0.02 | 0.08 |
| second inert fine particles | | | | | | | | | |
| type | | spherical silica | spherical silica | spherical silica | spherical silica | spherical silica | spherical silica | spherical silica | — |
| average particle diameter | μm | 0.1 | 0.1 | 0.1 | 0.1 | 0.1 | 0.1 | 0.1 | — |
| quantity | wt % | 0.20 | 0.30 | 0.50 | 0.20 | 0.30 | 0.50 | 0.30 | — |

TABLE 2-continued

| | unit | Ex. 6 | Ex. 7 | Ex. 8 | Ex. 9 | C. Ex. 9 | C. Ex. 10 | C. Ex. 11 | C. Ex. 12 |
|---|---|---|---|---|---|---|---|---|---|
| second polyester layer third inert fine particles | | | | | | | | | |
| type | | spherical silica | no lubricant | spherical silica | spherical silica | spherical silica | spherical silica | — | spherical silica |
| average particle diameter | μm | 0.1 | | 0.1 | 0.1 | 0.1 | 0.1 | — | 0.1 |
| quantity | wt % | 0.01 | | 0.01 | 0.05 | 0.01 | 0.1 | — | 0.01 |
| coating layer | | | | | | | | | |
| water-dispersible copolyester resin | wt | 100 | 100 | 100 | 100 | — | — | — | 100 |
| colloidal particles | wt | 20 | 20 | 20 | 20 | — | — | — | 20 |
| type | | crosslinked acryl particles | crosslinked acryl particles | crosslinked acryl particles | crosslinked acryl particles | — | — | — | crosslinked acryl particles |
| average particle diameter | nm | 20 | 15 | 40 | 20 | — | — | — | 0.02 |
| thickness of coating layer (dry) | nm | 10 | 8 | 20 | 10 | — | — | — | 10 |
| surface roughness surface of first polyester layer | | | | | | | | | |
| WRa(A) | nm | 9.0 | 6.0 | 14.0 | 9.0 | 6.0 | 18.0 | 8.0 | 3.5 |
| WRz(A) | nm | 120 | 180 | 150 | 120 | 160 | 300 | 200 | 80 |
| surface of second polyester layer | | | | | | | | | |
| WRa(B) | nm | 1.4 | 0.7 | 1.4 | 3.0 | 1.4 | 5.0 | 8.0 | 3.5 |
| WRz(B) | nm | 30 | 15 | 30 | 60 | 30 | 100 | 200 | 80 |
| friction coefficient with metal | | | | | | | | | |
| friction coefficient between surface of first polyester layer and metal ($\mu k_A$) | — | 0.30 | 0.37 | 0.27 | 0.30 | 0.37 | 0.30 | 0.30 | 0.40 |
| friction coefficient between surface of second polyester layer and metal ($\mu k_B$) | | 0.23 | 0.35 | 0.22 | 0.20 | 0.45 | 0.40 | 0.30 | 0.23 |
| friction coefficient between surface of first polyester layer and surface of second polyester layer | | 0.30 | 0.45 | 0.27 | 0.25 | 0.60 | 0.25 | 0.36 | 0.50 |
| roll form | | | | | | | | | |
| debris | | ⊚ | ○ | ⊚ | ⊚ | x | ⊚ | ⊚ | x |
| vertical wrinkles | | ⊚ | ○ | ⊚ | ⊚ | x | ⊚ | ⊚ | x |
| electromagnetic conversion characteristics | | ⊚ | ⊚ | ⊚ | ○ | ⊚ | x | x | ⊚ |
| running properties | | ⊚ | ○ | ⊚ | ⊚ | x | ○ | ⊚ | ○ |

Ex.: Example  C. Ex.: Comparative Example

As is obvious from Table 2, the films of Examples 6 to 9 show excellent electromagnetic conversion characteristics and have excellent winding properties and running properties.

EXAMPLES 10 AND 11 AND COMPARATIVE EXAMPLE 13

Dimethyl-2,6-naphthalate and ethylene glycol were polymerized by adding manganese acetate as an ester interchange catalyst, antimony trioxide as a polymerization catalyst, phosphorous acid as a stabilizer and particles shown in Table 1 as a lubricant in accordance with a commonly used method to obtain polyethylene-2,6-naphthalates (PEN) for first and second layers having an intrinsic viscosity (o-chlorophenol, 35° C.) of 0.61.

The pellets of the polyethylene-2,6-naphthalates were dried at 170° C. for 6 hours, supplied into the hoppers of two extruders, molten at 280 to 300° C. and laminated together using a multi-manifold coextrusion die in such a manner that a first layer was placed on one side of a second layer, and the resulting laminate was subjected to a surface finishing of about 0.3 s and extruded onto a rotary cooling drum having a surface temperature of 60° C. to obtain a 105-μm-thick unstretched laminated film. The discharge rates of the two extruders were adjusted to obtain layer thicknesses shown in Table 3.

The unstretched laminated film thus obtained was preheated at 120° C., stretched to 4.0 times between low-speed and high-speed rolls by heating with an IR heater having a surface temperature of 900° C. from 15 mm above, quenched and supplied to a stenter to be stretched to 5.0 times in a transverse direction at 145° C. The obtained biaxially oriented film was heat set with hot air at 210° C. for 4 seconds to obtain a 5.2-μm-thick biaxially oriented laminated polyester film. The film had a Young's modulus in a longitudinal direction of 600 kg/mm² (5884 MPa) and a Young's modulus in a transverse direction of 900 kg/mm² (8826 MPa).

A magnetic tape was produced as follows.

The same magnetic coating as that used in Example 1 was applied to one side (second layer) of the biaxially oriented laminated polyester film to a thickness of 0.5 µm, aligned in a DC magnetic field of 2,500 Gauss and dried by heating at 100° C., and the resulting film was supercalendered (linear pressure of 300 kg/cm, temperature of 80° C.) and rolled. This roll was left in an oven at 55° C. for three days and cut to a width of 8 mm to obtain a magnetic tape.

EXAMPLE 12

A biaxially oriented laminated polyester film was obtained in the same manner as In Example 9 except that particles shown in Table 3 were added to the first polyester layer and the second polyester layer and that the stretch ratios in longitudinal and transverse directions were changed so that the Young's modulus in a longitudinal direction of the film is to be 550 kg/mm$^2$ and that in a transverse direction is to be 1,200 kg/mm$^2$. Then, a magnetic tape was obtained in the same manner as in Example 9.

According to the present invention, a biaxially oriented laminated polyester film can be provided that has excellent electromagnetic conversion characteristics and excellent winding properties and running properties. This polyester film is useful as a base film for magnetic recording media, particularly as a base film for magnetic tapes such as a ½-inch video tape, 8-mm video tape, data cartridge tape and digital video tape.

What is claimed is:

1. A biaxially oriented laminated polyester film comprising:

(A) a first polyester layer which comprises a first aromatic polyester containing inert fine particles and has a center plane average surface roughness of an exposed surface of 4 to 15 nm, the inert fine particles consisting of first inert fine particles having an average particle diameter

TABLE 3

|  | unit | Ex. 10 | Ex. 11 | Ex. 12 | C. Ex. 13 |
|---|---|---|---|---|---|
| layer structure | | two layers | two layers | two layers | two layers |
| thickness | | | | | |
| first polyester layer ($t_A$) | µm | 2.4 | 1.8 | 2.4 | 0.25 |
| second polyester layer ($t_B$) | µm | 2.8 | 3.4 | 2.8 | 4.95 |
| total thickness | | 5.2 | 5.2 | 5.2 | 5.2 |
| first polyester layer | | | | | |
| first inert fine particles | | | | | |
| type | | spherical silica | crosslinked silicon resin particles | spherical silica | crosslinked silicon resin particles |
| average particle diameter | µm | 0.3 | 0.4 | 0.25 | 0.55 |
| quantity | wt % | 0.25 | 0.10 | 0.30 | 0.01 |
| second inert fine particles | | | | | |
| type | | spherical silica | spherical silica | spherical silica | spherical silica |
| average particle diameter | µm | 0.14 | 0.14 | 0.10 | 0.10 |
| quantity | wt % | 0.15 | 0.20 | 0.60 | 0.20 |
| total average particle diameter ($d_A$) | µm | 0.16 | 0.15 | 0.11 | 0.10 |
| $t_A/d_A$ | | 15 | 12 | 22 | 2.5 |
| second polyester layer | | | | | |
| third inert fine particles | | | | | |
| type | | spherical silica | spherical silica | spherical silica | spherical silica |
| average particle diameter | µm | 0.14 | 0.15 | 0.1 | 0.05 |
| quantity | wt % | 0.01 | 0.03 | 0.08 | 0.01 |
| surface roughness | | | | | |
| surface of first polyester layer | | | | | |
| WRa (A) | nm | 12.0 | 8.0 | 10.0 | 5.0 |
| WRz (A) | nm | 130 | 180 | 110 | 110 |
| surface of second polyester layer | | | | | |
| WRa (B) | nm | 2.2 | 3.0 | 1.5 | 0.8 |
| WRz (B) | nm | 40 | 60 | 25 | 17 |
| friction coefficient between surface of first polyester layer and surface of second polyester layer | | 0.40 | 0.45 | 0.43 | 0.60 |
| roll form | | | | | |
| debris | | ⊚ | ○ | ⊚ | x |
| vertical wrinkle | | ⊚ | ○ | ⊚ | x |
| electromagnetic conversion characteristics | | ⊚ | ○ | ⊚ | ⊚ |
| running properties | | ○ | ⊚ | ○ | ○ |

Ex.: Example   C. Ex.: Comparative Example

As is obvious from Table 3, the films of Examples 10 to 12 show excellent electromagnetic conversion characteristics and have excellent winding properties and running properties.

of 0.2 to 0.4 µm and second inert fine particles having an average particle diameter which is 0.1 to 0.3 µm smaller than that of the first inert fine particles, and the contents of the first inert fine particles and the second inert fine particles being 0.05 to 0.4 wt % and 0.1 to 0.8 wt % based on the first aromatic polyester, respectively; and (B) a second polyester layer comprising a second aromatic polyester which may contain inert fine particles and having a center plane average surface roughness of an exposed surface of 0.5 to 3.5 nm, the inert fine particles being third inert fine particles having an average particle diameter of 0.05 to 0.2 μm and the content of the third inert fine particles being 0 to 0.1 wt % based on the second aromatic polyester, (C) the friction coefficient between the first polyester layer and the second polyester layer being 0.5 or less.

2. The biaxially oriented laminated polyester film of claim 1, wherein the content of the first inert fine particles is 0.1 to 0.4 wt % based on the first aromatic polyester.

3. The biaxially oriented laminated polyester film of claim 1, wherein both the first inert fine particles and the second inert fine particles in the first polyester layer are spherical.

4. The biaxially oriented laminated polyester film of claim 1, wherein the first inert fine particles and the second inert fine particles in the first polyester layer are selected from the group consisting of spherical silica and spherical heat resistant polymer particles.

5. The biaxially oriented laminated polyester film of claim 1, wherein the exposed surface of the first polyester layer has a 10-point average surface roughness of 100 to 200 nm.

6. The biaxially oriented laminated polyester film of claim 1 or 5, wherein the exposed surface of the second polyester layer has a 10-point average surface roughness of 10 to 80 nm.

7. The biaxially oriented laminated polyester film of claim 1, wherein the first polyester layer has a center plane average surface roughness of 6 to 15 nm.

8. The biaxially oriented laminated polyester film of claim 1, wherein the ratio ($t_1/\bar{d}$) of the thickness ($t_1$) of the first polyester layer to the average particle diameter ($\bar{d}$) of the first inert fine particles and the second inert fine particles is 1 to 25.

9. The biaxially oriented laminated polyester film of claim 1, wherein the ratio ($t_1/\bar{d}$) of the thickness ($t_1$) of the first polyester layer to the average particle diameter ($\bar{d}$) of the first inert fine particles and the second inert fine particles is 10 to 25.

10. The biaxially oriented laminated polyester film of claim 1, wherein the total number of protrusions on the exposed surface of the first polyester layer is $1 \times 10^4/mm^2$ or more and the height of a protrusion at a cumulative number of protrusions of $30/mm^2$ is 20 to 50 nm.

11. The biaxially oriented laminated polyester film of claim 1, wherein the second polyester layer contains the third inert fine particles, which are spherical.

12. The biaxially oriented laminated polyester film of claim 1, wherein the second polyester layer contains the third inert fine particles, which are spherical silica or spherical heat resistant polymer particles.

13. The biaxially oriented polyester film of claim 1, wherein the content of the third inert fine particles in the second polyester layer is 0.005 to 0.1 wt % based on the second aromatic polyester.

14. The biaxially oriented laminated polyester film of claim 1 or 13, wherein the exposed surface of the second polyester layer has a 10-point average surface roughness of 20 to 80 nm.

15. The biaxially oriented laminated polyester film of claim 1 or 13, wherein the second polyester layer has a center plane surface roughness of 1 to 3.5 nm.

16. The biaxially oriented polyester film of claim 1, wherein the height of a protrusion at a cumulative number of protrusions of $30/mm^2$ of the exposed surface of the second polyester layer is 20 nm or less.

17. The biaxially oriented polyester film of claim 1, wherein the first polyester layer further contains fourth inert fine particles having a smaller average particle diameter than those of the first inert fine particles and the second inert fine particles.

18. The biaxially oriented laminated polyester film of claim 1 which has a Young's modulus in a longitudinal direction of 500 to 1,000 kg/mm$^2$ (4904 to 9807 MPa) and a Young's modulus in a transverse direction of 500 to 1,400 kg/mm$^2$ (4904 to 13730 MPa).

19. The biaxially oriented laminated polyester film of claim 18, wherein the Young's modulus in a transverse direction is higher than that in a longitudinal direction.

20. The biaxially oriented laminated polyester film of claim 18, wherein the Young's modulus in a longitudinal direction is higher than that in a transverse direction.

21. The biaxially oriented laminated polyester film of claim 1 or 18, wherein the total of Young's modulus in longitudinal and transverse directions is 1,300 to 2,000 kg/mm$^2$ (12749 to 1961 MPa).

22. The biaxially oriented laminated polyester film of claim 21, wherein the Young's modulus in a transverse direction is higher than that in a longitudinal direction.

23. The biaxially oriented laminated polyester film of claim 21, wherein the Young's modulus in a longitudinal direction is higher than that in a transverse direction.

24. The biaxially oriented laminated polyester film of claim 1, wherein both the first aromatic polyester of the first polyester layer and the second aromatic polyester of the second polyester layer are polyethylene-2,6-naphthalene dicarboxylate.

25. The biaxially oriented laminated polyester film of claim 1 which further has a cover layer, which comprises a water-dispersible copolyester resin and inert fine particles having an average particle diameter of 0.01 to 0.05 μm, formed on a surface of the second polyester layer not in contact with the first polyester layer.

26. The biaxially oriented laminated polyester film of claim 25, wherein the friction coefficients of the exposed surfaces of the first polyester layer and the cover layer with a metal are 0.4 or less.

27. The biaxially oriented laminated polyester film of claim 25, wherein the friction coefficient of the exposed surface of the first polyester layer with a metal is equal to or larger than that of the cover layer with a metal.

28. The biaxially oriented laminated polyester film of claim 1 which is a base film for a digital magnetic recording medium.

* * * * *